(12) United States Patent
Moth

(10) Patent No.: US 7,652,393 B2
(45) Date of Patent: Jan. 26, 2010

(54) APPARATUS AND METHOD FOR EMPLOYING A DC SOURCE WITH AN UNINTERRUPTIBLE POWER SUPPLY

(75) Inventor: Klaus Moth, Kolding (DK)

(73) Assignee: American Power Conversion Corporation, West Kingston, RI (US)

(*) Notice: Subject to any disclaimer, the term of this patent is extended or adjusted under 35 U.S.C. 154(b) by 128 days.

(21) Appl. No.: 11/521,068

(22) Filed: Sep. 14, 2006

(65) Prior Publication Data

US 2008/0067872 A1    Mar. 20, 2008

(51) Int. Cl.
*H02J 7/00* (2006.01)

(52) U.S. Cl. .................................................. 307/64

(58) Field of Classification Search ............... 307/23, 307/64, 65, 66
See application file for complete search history.

(56) References Cited

U.S. PATENT DOCUMENTS

| | | | |
|---|---|---|---|
| 4,673,825 A | 6/1987 | Raddi et al. | |
| 4,673,826 A | 6/1987 | Masson | |
| 4,827,151 A | 5/1989 | Okado | |
| 5,148,043 A | 9/1992 | Hirata et al. | |
| 5,241,217 A | 8/1993 | Severinsky | |
| 5,686,768 A | 11/1997 | Thomsen et al. | |
| 6,069,412 A | 5/2000 | Raddi et al. | |
| 6,184,593 B1* | 2/2001 | Jungreis | 307/64 |
| 6,201,371 B1 | 3/2001 | Kawabe et al. | |
| 6,812,587 B2 | 11/2004 | Gilbreth et al. | |
| 6,879,061 B2* | 4/2005 | Haneda et al. | 307/102 |
| 6,906,933 B2 | 6/2005 | Taimela | |
| 6,958,550 B2 | 10/2005 | Gilbreth et al. | |
| 7,012,825 B2 | 3/2006 | Nielsen | |
| 7,050,312 B2* | 5/2006 | Tracy et al. | 363/37 |
| 7,402,921 B2* | 7/2008 | Ingemi et al. | 307/64 |
| 2006/0043793 A1 | 3/2006 | Hjort et al. | |
| 2007/0216229 A1* | 9/2007 | Johnson et al. | 307/86 |

* cited by examiner

*Primary Examiner*—Jared J Fureman
*Assistant Examiner*—Michael Rutland Wallis
(74) *Attorney, Agent, or Firm*—Lando & Anastasi, LLP

(57) ABSTRACT

At least one aspect is directed to an uninterruptible power supply including an I/O and an output in electrical communication with the I/O. The UPS also includes electronic circuitry which is adapted to, in a first mode of operation, receive power from the I/O and convert the AC power to DC power. The electronic circuitry is also adapted to, in a second mode of operation, receive DC power and to provide AC power to the I/O. The electronic circuit is further adapted to, in the first mode of operation, convert the DC power to AC power and to provide the AC power at the output.

35 Claims, 4 Drawing Sheets

APPARATUS AND METHOD FOR EMPLOYING A DC SOURCE WITH AN UNINTERRUPTIBLE POWER SUPPLY

BACKGROUND OF INVENTION

1. Field of Invention

Embodiments of the invention relate generally to uninterruptible power supplies ("UPS"). More specifically, at least one embodiment relates to an apparatus and method for employing a DC source with an uninterruptible power supply.

2. Discussion of Related Art

Uninterruptible power supplies are often used to supply power to critical loads to reduce the risk that those loads will experience an unplanned power outage. Generally, a primary power supply (e.g., power supplied from a utility) is supplied to an input of the UPS and critical loads are connected to an output of the UPS. Functionally, an on-line UPS typically operates by converting an alternating current ("AC") normal supply to direct current ("DC"). The DC is used to continuously charge batteries and is also supplied to an inverter that converts the DC back to AC providing a regulated AC voltage to the output of the UPS. The batteries in the UPS provide power to the inverter for conversion to AC for a short period of time, for example, when the primary source of power is not available.

Two different UPS topologies are depicted in FIGS. 1 and 2. In FIG. 1, a traditional double-conversion type UPS 100 is shown. The UPS 100 includes an input module 102 (e.g., a rectifier), an input 103, an output module 104 (e.g., an inverter), an output 105, and batteries 106. It is referred to as a double conversion topology because AC input power is converted to DC power in the input module 102 (a first energy conversion) and DC power is converted to AC in the output module 104 (a second energy conversion). In addition to the UPS 100, a UPS system 107 may also include a generator 108 and a transfer switch 110 (e.g., an automatic transfer switch).

In operation, power is supplied from the power source 112 to a non-critical load 114 via the transfer switch 110 where the circuit supplying the non-critical load 114 may be included as part of the UPS. During most periods, power is supplied to critical load or loads 116 via the transfer switch 110 and UPS 100. The power supplied to the input 103 is converted to DC by the input module 102 and supplied to a DC bus 118. Power is supplied from the DC bus 118 to the batteries 106 to maintain a float voltage on the batteries that maintains their charge. Power is also supplied from the DC bus 118 to the output module 114 to supply power to the critical load 116 (e.g., a load that is intended to receive continuous regulated power).

When a loss of the normal power source 112 is detected (by, for example, sensing logic in the UPS 100) a start signal is provided to start the standby generator 108. Power from the batteries 106 is supplied to the output module 104 to supply power to the critical load 116 connected to the output 105 of the UPS during the period when primary power is unavailable and the generator 108 is not yet producing rated output voltage. When the generator 108 is producing rated voltage, the transfer switch 110 operates to disconnect the normal source 112 from the UPS 100 and connect the generator to the input 103 of the UPS 108. The generator 108 supplies the power for the critical loads 116 and maintains a charge on the batteries 106. Because the UPS includes batteries, there is no interruption in the power supplied to the UPS output 105 when the primary power is lost and during the transition to the generator 108. Conversely, an interruption in the power supplied to the non-critical loads 114 does occur when the primary power is lost because they are not connected to the output 105 of the UPS. The non-critical load 114 remains without power until the transfer switch 110 operates to connect the generator 108 to the non-critical load 114. If necessary, the critical load 116 will continue to operate while being supplied with power originating from the generator so long as the generator is operating, e.g., has fuel. When the primary power source 112 is again available, the transfer switch 110 operates to disconnect the generator 108 and reconnect the primary power source 112 to the UPS input 103.

Referring now to FIG. 2, another UPS topology is depicted. The UPS 200 of FIG. 2 also includes an input module 202, an input 203, an output module 204, an output 205, and batteries 206. The UPS in FIG. 2, however, includes a boost converter 219 as part of the input module 202. The topology shown in FIG. 2, is provided, for example, in the SYMMETRA® UPS line manufactured by American Power Conversion Corporation of West Kingston, R.I.

The input module 202 can include a power factor correction circuit that may be included in the boost converter 219. The power factor correction circuit allows the UPS 200 to draw power from the primary power source 212 while maintaining a favorable relationship between the current and the voltage at the input 203, i.e., maintain approximately a unity power factor. The boost converter 219 provides a method by which the batteries 206 can be connected to the UPS 200 in conjunction with the power factor correction circuit.

The UPS 200 may be included in a UPS system 207 that also includes a generator 208 and a transfer switch 210. In operation, power is supplied from a power source 212 to the non-critical load 214 via the transfer switch 210 where the circuit supplying the non-critical load 214 may be included as part of the UPS. Here too, during most periods, power is supplied to critical load 216 via the transfer switch 210 and UPS 200. The power supplied to the input 203 is converted to DC by the input module 202 and supplied to a DC bus 218. Power is supplied from the DC bus 218 to the output module 204 to supply power to the critical load 216 connected to the UPS output 205.

The UPS system 207 in FIG. 2 responds to a loss of the primary source of power in a manner that is similar to the response of the UPS system 107. More specifically, when a loss of the normal power source 212 is detected, a start signal is provided to start the standby generator 208. Power from the batteries 206 is supplied to the output module 204 to supply power to the critical load 216 during the period when primary power is unavailable and the generator 208 is not yet producing rated output voltage. After the generator 208 is producing rated voltage, the transfer switch 210 operates to disconnect the normal source 212 from the UPS 200 and connect the generator to the input 203 of the UPS 208. Because the UPS includes batteries, there is no interruption in the power supplied to the UPS output 205 when the primary power is lost and during the transition to the generator 208. Conversely, an interruption in the power supplied to the non-critical loads 214 does occur when the primary power is lost because they are not connected to the output 205 of the UPS. Non-critical load 214 remains without power until the transfer switch 210 operates to connect the generator 208 to the non-critical load 214.

When the primary power source 212 is again available, the transfer switch 210 operates to disconnect the generator 208 and reconnect the primary power source 212 to the UPS input 203 and the non-critical loads 214. Once again, the critical loads 216 do not experience a loss of power when the transfer switch 210 operates, but the non-critical loads 214 temporarily lose power when the transfer switch 210 disconnects the generator 208 and transfers the non-critical loads 214 back to the primary source of power 212.

Typically, the electrical ratings (e.g., voltage, current, power, etc.) of the UPS (e.g., 200) correspond to the requirements of the power system in which it is installed. When, for example, the critical load 216 connected to the UPS 200 is not expected to exceed a maximum of 500 kilowatts the input module 202 and the output module 204 of the UPS 200 can be rated for a minimum of 500 kilowatts, although to provide a margin, a UPS generally has a capacity that exceeds the expected maximum demand by some percentage. Electrical ratings can be increased by, for example, increasing the current or voltage rating of the UPS components, and/or by adding input modules 202 and output modules 204. In general, increases in the UPS ratings will increase the cost of the UPS 200 because of the increased cost of higher rated power electronics required for the UPS. As a result, users tend to minimize the amount of load that is supplied by the UPS 200 to the extent possible, and select a UPS 200 that meets the expected load requirements of the critical loads 216 and no more, to minimize the power requirements (and correspondingly, the cost) of the UPS 200.

One result of the existing approaches is that AC generators are typically used with a UPS when a generator is employed with a UPS because the input to the UPS is AC. Employing an AC generator instead of a DC generator increases the cost and complexity of these approaches, however, because a transfer switch is required to switch between the AC sources that supply power to the UPS. In addition, AC generators are synchronous machines that run at a fixed speed related to the system frequency. As a result, AC generators typically run slower than the speeds at which DC generators routinely operate. An increase in generator speed results in an increase in the generator power rating and a corresponding decrease in the cost per kilowatt of electricity generated; therefore, it is advantageous to employ DC generators.

SUMMARY OF INVENTION

According to one aspect of the invention, an uninterruptible power supply includes an I/O, an output in electrical communication with the I/O, and electronic circuitry coupled to the I/O and the output. In one embodiment, the electronic circuitry is adapted to, in a first mode of operation, receive AC power from the I/O and convert the AC power to DC power, and in a second mode of operation, receive DC power and provide AC power to the I/O. In one embodiment, the electronic circuitry is further adapted to, in the first mode of operation, convert the DC power to AC power and provide the AC power at the output.

In one embodiment, the uninterruptible power supply includes a first circuit adapted to receive DC power from a DC power source and provide AC power to the I/O in the second mode of operation. In a further embodiment, the uninterruptible power supply includes a second circuit adapted to receive DC power from the DC power source and provide AC power to the output in the second mode of operation. In a version of this embodiment, an output of the first circuit is adapted to be coupled to both an input of the second circuit and the DC power source.

In another aspect, the invention provides a method of supplying power to two or more electrical loads. According to one embodiment, the method includes acts of supplying, in a first mode of operation, power from a power source to an input of an uninterruptible power supply, supplying power from the power source to a first load in the first mode of operation, and supplying power to a second load from an output of the uninterruptible power supply in the first mode of operation. In a further embodiment, the method includes an act of supplying, in a second mode operation, power to the first load from the input of the uninterruptible power supply. In a further embodiment, the method includes acts of supplying power to the second load from the output of the uninterruptible power supply in the second mode of operation, and supplying power to both the first load and the second load from a common source of power in the second mode of operation. In a version of this embodiment the common source of power is an extended-runtime DC source.

In yet another aspect, the invention includes a UPS system for supplying power to two or more electrical loads. In accordance with one embodiment, the system includes an I/O adapted to connect to a first power source and a first load, an input adapted to connect to a second power source, an output adapted to connect to a second load, and means for receiving power from the first power source via the I/O during a first mode of operation, and supplying power from the second power source to the first load via the I/O during a second mode of operation. In one embodiment, the system is adapted to supply power from the output to the second load during both the first mode of operation and the second mode of operation. In one version, the I/O is adapted for connection to an AC power source and the input is adapted for a connection to a DC power source.

BRIEF DESCRIPTION OF DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings.

DETAILED DESCRIPTION

Figure 1:
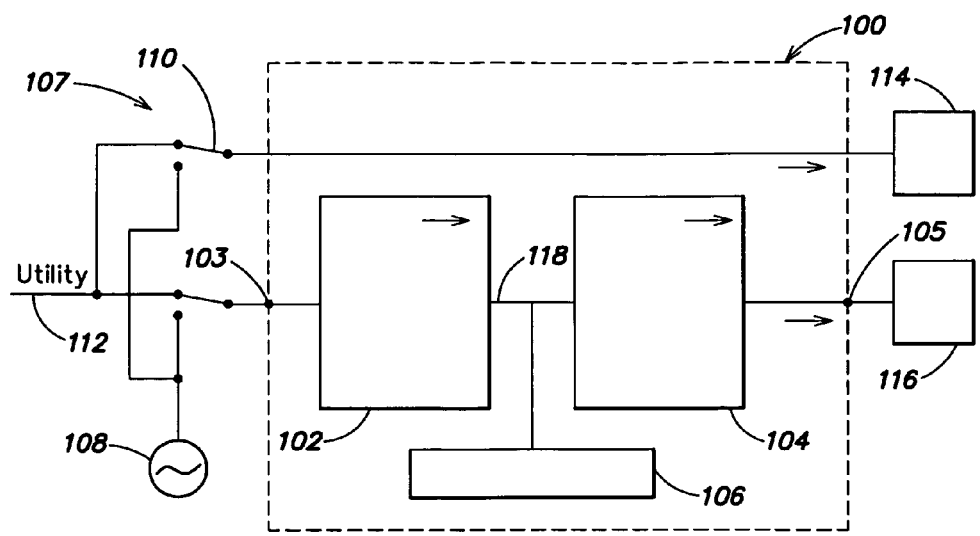
FIG. 1 is a block diagram of a prior art system for supplying power with an uninterruptible power supply.

This invention is not limited in its application to the details of construction and the arrangement of components set forth in the following description or illustrated in the drawings. The invention is capable of other embodiments and of being practiced or of being carried out in various ways. Also, the phraseology and terminology used herein is for the purpose of description and should not be regarded as limiting. The use of "including," "comprising," or "having," "containing", "involving", and variations thereof herein, is meant to encompass the items listed thereafter and equivalents thereof as well as additional items.

Existing approaches that use batteries as the only source of DC power employed in a UPS have shortcomings because generally the batteries do not have the capacity to supply power to both primary loads (e.g., critical) and secondary loads (e.g., non-critical) for any length of time, if at all. As a result, a UPS generally only supplies power to the most critical loads. This approach is problematic, however, because of the demands placed on electrical systems by modern facilities. For example, the increased reliance on computers has increased electrical demands generally, increased the need for uninterruptible power, and increased the types of load that are considered primary. Computer centers provide one specific example because they typically require that emergency power be supplied both to the computers (the most primary load) and their support systems (e.g., air conditioning systems) in order to allow the computer center to operate for an extended period of time.

The variety and capability of available DC power sources has substantially increased with time. Interest in integrating DC sources other than batteries in UPS systems has increased correspondingly. Fuel cells, photovoltaic power sources, and DC micro turbines provide examples of DC sources that are currently available. Each of these DC sources has an advantage over batteries because each source is capable of continuously supplying a rated power output for an extended period. That is, unlike batteries which are typically employed in a UPS to bridge time delays during a system switchover from the primary source of power to a backup source of power (e.g., a generator), these DC sources can be employed to continuously power the electrical load. This type of DC source is referred to as an extended-runtime power source. If sized properly, an extended-runtime source can supply power to one or more electrical loads, e.g., both the primary and the secondary loads.

In general, the estimated runtime of a UPS is measured in minutes (e.g., an estimated run time less than 1 hour) where the UPS does not employ an extended-runtime source. The estimated runtime of a UPS system employing an extended-runtime source, however, is measured in hours, days or weeks.

Although there is great interest in integrating DC power sources in UPS systems, effective integration can be cost prohibitive because it can result in substantial increases in equipment ratings. One difference between current approaches that employ an AC backup power source and those that employ a DC backup power source is that typically the DC source is connected to the internal circuitry of the UPS (i.e., the DC bus of a UPS) while the typical AC source is connected externally (e.g., to the input of the UPS). In general, the rating of the UPS must be increased to export power supplied by DC sources to both the primary and the secondary loads via the UPS. Current approaches do not offer a cost effective approach to increasing the electrical ratings of common UPS topologies because such approaches generally require significant increases in the power ratings of the devices used in the UPS and a corresponding increase in the size and cost of the UPS.

Integration of a DC source in a UPS system is first considered here in view of the double conversion topology described with reference to FIG. 1. Integration of a DC source with the UPS of FIG. 1 may be achieved with the connection of the DC source to the bus 118. Where the objective is to supply power to both primary and secondary loads, power is delivered from the DC bus 118 to each load 114, 116. One possible approach is to provide the UPS 100 with an additional output module similar to output module 104 where one output module 104 is connected to a first UPS output (e.g., output 105) which is connected to the primary load 116, and another output module which is connected to the secondary load 114. In this approach, both output modules include an input connected to the DC bus 118. Where a transfer switch is connected to the output of the second output module, this approach can be implemented without increasing the rating of the input module 102 because the secondary loads will not receive power from the UPS unless the normal power source 112 is unavailable. Although an increase in the rating of the input module 102 may not be required in this configuration, this approach results in a substantial cost increase due to the cost of the second output module.

A second possible approach based on the double conversion topology of FIG. 1 also connects the DC source to the bus 118, but supplies power to both the primary and the secondary loads from outputs of the UPS in all modes of operation. Specifically, a second input module is added in parallel with the input module 104 shown in FIG. 1 and a second output module is added to supply power to the secondary loads. The output 105 remains connected to the primary load 116 and another output associated with the second output module is connected to the secondary load 114. Where a modular topology is not used, the ratings of circuitry corresponding to each of the input module 102 and the output module 104 can be increased to handle the power demands of both the primary load and the secondary load. Each of these two approaches result in a substantial cost increase due at least to the increased cost of the additional input module and output module, and the increased cost resulting from increased equipment ratings, respectively. Further, these approaches can also increase the complexity of the UPS.

Integration of a DC source in the UPS topology shown in FIG. 2 using conventional techniques results in many of the same drawbacks as those just described with reference to the topology of FIG. 1. Integration of a DC source with the UPS of FIG. 1 typically includes the connection of the DC source to the DC bus 218. As a result, where the objective is to supply power to both primary and secondary loads, power must be delivered from the DC bus 218 to each load. A first possible approach is to provide the UPS 200 with an additional output module similar to output module 204 where one output module 204 is connected to a first UPS output (e.g., output 205) which is connected to the primary load 216, and another output module is connected to the secondary load 214. Once again, where a transfer switch is connected to the output of the second output module, this approach can be implemented without increasing the rating of the input module 202 because the secondary loads will only receive power from the UPS 200 when the normal source of power 212 is unavailable. In this approach, the primary source of power 212 supplies power to the secondary loads during non-emergency operation. The resulting configuration leads to a result similar to the result previously described with reference to FIG. 1. That is, although an increase in the rating of the input module 202 may not be required in this configuration, a substantial cost increase results due to the cost of the second output module.

Figure 2:
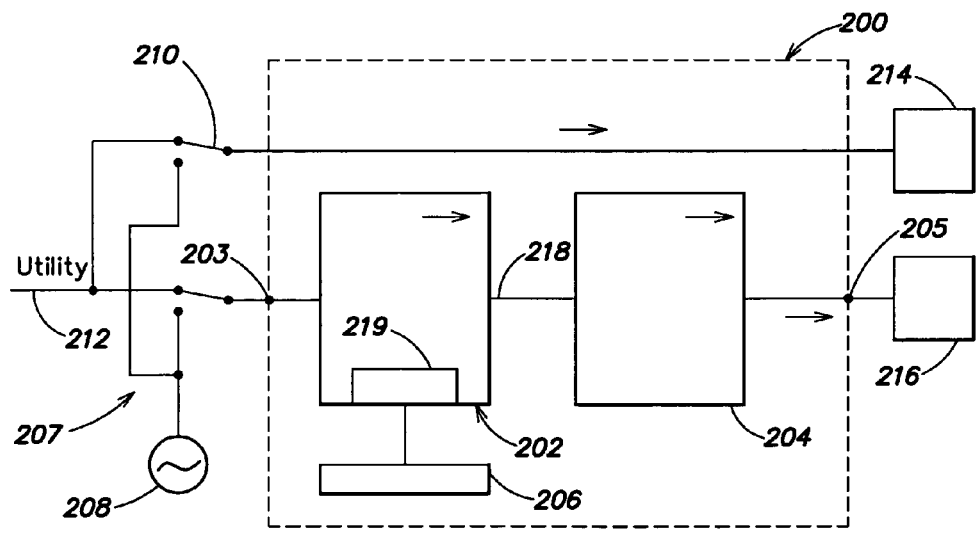
FIG. 2 is a block diagram of another prior art system for supplying power with an uninterruptible power supply

The second possible approach based on the topology of FIG. 2 is similar to the second approach described with reference to FIG. 1. The DC source is again connected to the bus 118 from which power is supplied to both the primary and the secondary loads from outputs of the UPS in all modes of operation. This approach adds a second input module in parallel with the input module 204 shown in FIG. 2 and adds a second output module to supply power to the secondary load 214. The output 205 remains connected to the primary load 116 and another output associated with the second output module is connected to the secondary load 114. Where a modular topology is not used, the ratings of circuitry corresponding to each of the input module 202 and the output module 204 can be increased to handle the power demands of both the primary load 116 and the secondary load 114. Generally, rating increases involve the replacement of the prior power electronic components with similar components that are rated to handle increased current, voltage or both.

Thus, the current approaches for connecting a DC source to the UPS 200 shown in FIG. 2 result in a substantial cost increase due at least to the increased cost of the additional input module and output module, and the increased cost resulting from increased equipment ratings, respectively. Further, these approaches can also increase the complexity of the UPS.

Figure 3:
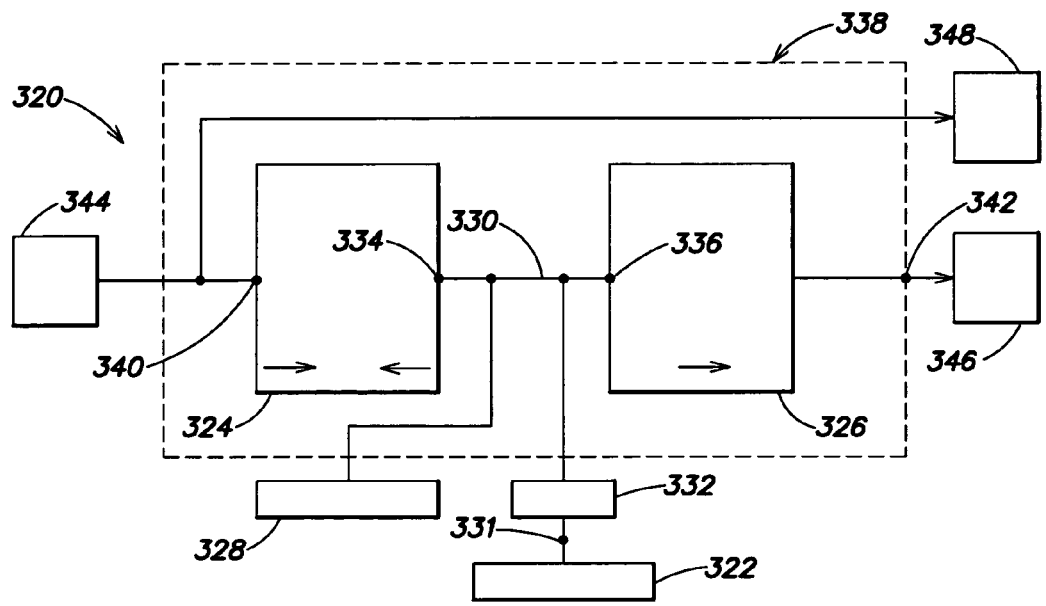
FIG. 3 is a block diagram of an uninterruptible power supply in accordance with one embodiment of the invention.

Referring now to FIG. 3, an embodiment of a UPS system 320 that includes a DC source 322 is shown. The DC source 322 can be any type of source of DC power including a DC generator (e.g., driven by a microturbine, a gas turbine, a wind turbine, a combustion motor, etc.), a fuel cell power source, a photovoltaic power source, and the like. The UPS system 320 may also include a first circuit 324 (e.g., input circuitry), a second circuit 326, batteries 328, and a DC bus 330.

As used herein, "I/O" describes an element that depending upon the embodiment is an input, an output or both an input and an output. In one embodiment, the I/O is a bi-directional power terminal.

The components of the UPS system 320 can be combined such that, in one embodiment, the UPS system 320 includes a UPS 338 including the first circuit 324 and the second circuit 326. In addition, the UPS 338 can include an AC I/O 340 connected to the first circuit 324, an output 342 connected to the second circuit 326, and a DC bus 330. According to one embodiment, the AC I/O 340 is included in the first circuit and the output 342 is included in the second circuit. In one embodiment, the batteries 328 are part of the UPS 338. The UPS 338 may also be configured such that, in some embodiments, the DC source 322 is included in the UPS 338. In a version of this embodiment, the third circuit 332 is also included in the UPS 338. In another embodiment, the DC source 322 is external to the UPS 338. In versions of this embodiment, the third circuit 332 may or may not be included in the UPS 338.

In one embodiment, an output 331 of the DC source is connected to a third circuit 332 that regulates the power provided by the DC source 332 before it is connected to the DC bus 330. In versions of one or more embodiments employing the third circuit 332, the third circuit 332 circuit is a converter, for example, a DC/DC converter that receives power from the DC source 322 at a first voltage level and produces a DC voltage at a second voltage level that can be different than the first voltage level. In other embodiments, the third circuit 332 is not employed in the UPS system 320. In addition, where a modular design is employed, one or more of the first circuit 324, the second circuit 326, and the third circuit 332 can be a separate module.

The DC bus 330 connects a DC I/O 334 of the first circuit 324 to an input 336 of the second circuit 326 via the DC bus 330. The batteries 328 and, in one embodiment, an output of the converter 332 are also connected to the DC bus 330.

As used herein "I/O" describes an element that depending upon the embodiment is an input, an output or both an input and an output.

The components of the UPS system 320 can be combined such that, in one embodiment, the UPS system 320 includes a UPS 338 including the first circuit 324 and the second circuit 326. In addition, the UPS 338 can include an AC I/O 340 connected to the first circuit 324, an output 342 connected to the second circuit 326, and a DC bus 330. In one embodiment, the batteries 328 are part of the UPS 338. The UPS 338 may also be configured such that, in some embodiments, the DC source 322 is included in the UPS 338. In a version of this embodiment, the third circuit 332 is also included in the UPS 338. In another embodiment, the DC source is external to the UPS 338. In versions of this embodiment, the third circuit 332 may or may not be included in the UPS 338.

In one embodiment, the DC bus 330 can be any circuitry that is employed to transmit DC from the first circuit 324 to the second circuit 326. That is, the DC bus 330 may be one or more conductors such as cables, DC links, bus bar, solder tracing, etc. provided that the DC bus 330 is rated for the current, voltage and power at which it will operate.

The circuitry included in the UPS 338 (e.g., the first circuit 324, the second circuit 326, the third circuit 332, etc.) can be any form of circuitry rated for the current, voltage and power at which it will operate. That is, the circuitry can include electronic circuitry that may include power electronic components. The circuitry can also include both analog and digital components including one or more microprocessors employed in controlling the operation of the UPS 338. In one or more further embodiments, the DC bus 330 is included, at least in part, in the first circuit 324, the second circuit 326 or the third circuit 332. In a version of these embodiments, portions of the DC bus 330 are included in each of the first circuit 324 and the second circuit 326. In another version, portions of the DC bus 330 are included in each of the first circuit 324, the second circuit 326 and the third circuit 332.

According to one embodiment, the UPS system 320 is included in an electrical system where an AC power source 344 is coupled to the AC I/O 340 of the UPS 338. The first power source can also be connected to one or more secondary loads 348, and the output 342 of the UPS can be connected to one or more primary loads 346. As is known, there may also be a connection for the input I/O 340 to the output 342 through a bypass switch that allows power to be supplied directly from the input I/O 340 to the output 342 upon a failure of the UPS. According to one embodiment, an isolation switch can be located between the AC I/O 340 and the AC power source 344 to isolate the UPS 338 from the AC power source 344. The isolation switch (or another isolation switch) can be employed to isolate the AC I/O from the secondary load 348.

In at least one embodiment, as will now be discussed, the first circuit 324 of FIG. 3 is bi-directional. That is, the UPS 338 can operate in at least two modes of operation. In a first mode of operation, the first circuit 324 receives power from the AC power source 344 and provides power at the DC I/O 334 of the first circuit 324. In a second mode of operation the first circuit receives power at the DC I/O 334 and provides power at the AC I/O 340 of the UPS. As used herein, the terms "first" mode of operation and "second" mode of operation are used to distinguish between two separate operating conditions and they are not used to describe that the various modes of operation occur in any particular sequence. As is described in greater detail below, in various embodiments, the DC source 322 can supply power to the DC bus 330 in both the first mode of operation and the second mode of operation. In addition, in various embodiments, the AC power source 344 may be available and energized in the second mode of operation. That is, the UPS 338 provides an AC output in parallel with the AC power source 344 and power is supplied from the UPS 338 to, for example, a power grid and/or load to which the AC power source 344 is also connected.

In one embodiment, in the first mode of operation, the AC power source 344 provides power to the secondary load 348 and, via the UPS 338, also provides power to the primary load 346 connected to the output 342 of the UPS 338. In one embodiment of the second mode of operation, the DC source 322 provides power to the DC I/O 334 of the first circuit 324 and to an input 336 of the second circuit 326. As is described in greater detail herein, the power supplied by the DC source 322 to the first circuit 324 is converted to AC by the first circuit 324 and supplied at the AC I/O 340 of the UPS. The power supplied by the DC source 322 to the second circuit 326 is converted to AC by the second circuit 326 and is supplied at the output 342 of the UPS 338. In one or more embodiments, the DC source 322 has a capacity that is sufficient to supply the combined power requirements of the primary load 346 and the secondary load 348. In these embodiments, the DC source 322 can be employed to supply power to both the primary load 346 and the secondary load 348 when the AC power source 344 is not available, i.e., the AC power source 344 is not supplying power for a period of time. Where the DC source 322 is an extended-runtime source, power can be supplied to the primary load 346 and the secondary load 348 on a substantially continuous basis.

In one embodiment, operation of the first circuit 324 is controlled such that the UPS 338 can operate in parallel with the AC power source 344. For example, while the AC power source 344 is energized and connected to the UPS system at the AC I/O 340, power generated by the DC source 322 can be supplied to the input of the UPS 338. In a version of this embodiment, with the DC source 322 operational and supplying power to the primary load 346, the UPS determines whether the DC source 322 has capacity available to supply power to, for example, the secondary load 348. If so, the first circuit 324 is operated such that power supplied from the DC source is provided at the AC I/O 340 of the UPS after it is converted to AC by the first circuit 324. The power from the DC source 322 that is provided to the AC I/O 340 is then supplied, for example, to either or both of the secondary load 348 and the electrical system that connects the AC power source 344 to the UPS 338, e.g., a utility electrical system.

In one or more embodiments, the DC source may not have the capacity to supply all the power required by the primary load 346. In this circumstance, in the first mode of operation, power from the AC power source 344 can be used to supplement the power supplied from the DC source 322 to the primary load 346. For example, the first circuit 324 can convert the AC power supplied by the AC power source 344 to DC at the DC I/O 334 of the first circuit 324 while the DC source 322 is also supplying power to the DC bus 330. The converted AC power (i.e., the DC at the DC I/O 334) supplied by the AC power source 344 is transmitted via the DC bus 330 to the input 336 of the second circuit 326. Power supplied by the DC source 322 can also be simultaneously supplied to the input 336 of the second circuit 326 via the DC bus 330. The combined power supplied by the AC power source 344 and the DC source 322 to the input 336 is converted from DC to AC by the second circuit 326 at the output 342 of the UPS 338 where it is supplied to the primary load 346.

Because the primary load 346 is connected to the output 342 of the UPS 338 the primary load 346 is supplied with a highly reliable power source. As a result, the primary load 346 will not likely experience unplanned power shutdowns. For example, power from the AC power source 344 can be supplied to the output 342 of the UPS. Where the AC power source 344 is unavailable or of limited capacity power can be supplied to the output 342 of the UPS from the DC source 322. In addition, power from the batteries 328 can be supplied to the output 342 of the UPS to supplement power supplied by AC power source 344 and/or the DC power source 322, or to provide the sole source of power to the primary load 346 on a temporary basis when neither the AC power source 344 nor the DC source 322 are available. In one embodiment, the AC power source 344 is the primary power source to the primary load 346 and the DC source 322 is used to supplement the AC power source as necessary to meet the power requirements of the primary load 342. In another embodiment, the DC source 322 is the primary power source for the primary load 346 and the AC power source 344 supplements the DC source as necessary to meet the power requirements of the primary load 342.

As mentioned above, the first circuit 324 is bi-directional. More specifically, in one embodiment the first circuit may include a rectifier module that can also be used as an inverter, for example, using a circuit as described in U.S. Pat. No. 5,302,858, issued Apr. 12, 1994 to Douglas Folts. In one embodiment, a control circuit controls the first circuit 324 to operate as a rectifier when power is being supplied by AC power source 344. In this mode of operation, the first circuit 324 is controlled to rectify the AC power from AC power source 344 thereby producing DC at the DC I/O 334 of the first circuit. The control circuit also controls the first circuit 324 to operate as an inverter during one or more periods when power is not being supplied by AC power source 344. In this mode of operation, the first circuit 324 is controlled to convert DC power supplied to the DC I/O 334 to AC power at the AC I/O 340.

Figure 4:
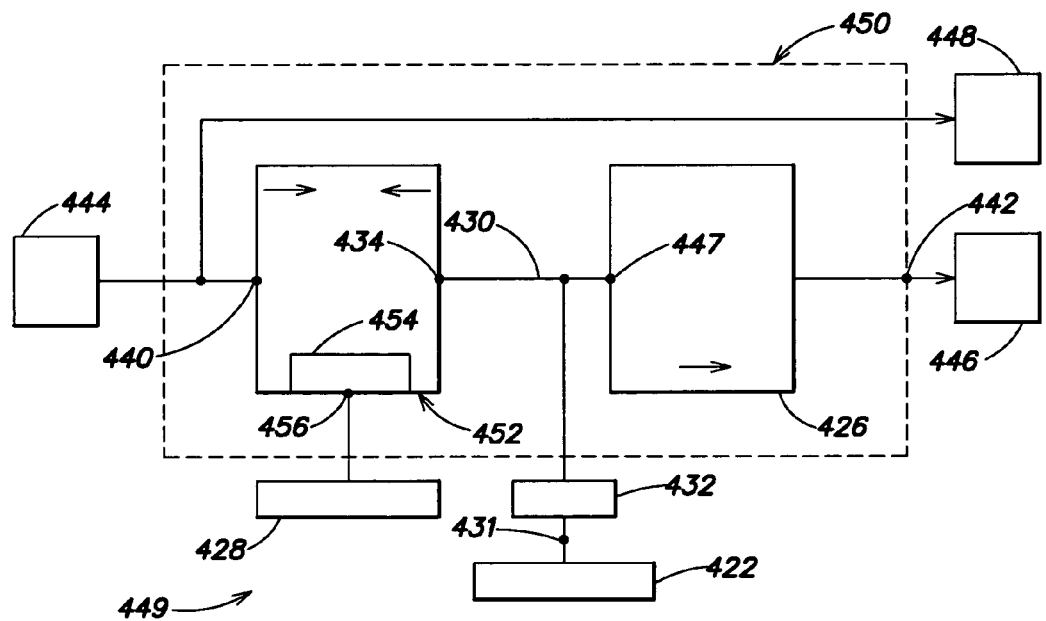
FIG. 4 is a block diagram of an uninterruptible power supply in accordance with another embodiment of the invention.

Referring now to FIG. 4, another embodiment of a UPS system 449 that includes a DC source 422 is shown. The UPS system 449 employs a different topology than the UPS system 420 depicted in FIG. 3 because the UPS system 449 of FIG. 4 includes a fourth circuit 454. In one or more embodiments, the fourth circuit is included in a first circuit 452 (e.g., input circuitry). In one or more versions of these embodiments, the fourth circuit 454 is a bi-directional circuit capable of operating in a boost mode and in a buck mode as is described in greater detail herein.

The UPS system 449 shown in FIG. 4 also includes a second circuit 426, batteries 428, a DC source 422, and a DC bus 430. In one embodiment, the UPS system also includes a third circuit 432. In one embodiment, the UPS system 449 is connected to an AC power source 444, primary load 446, and secondary load 448. According to one embodiment, an isolation switch can be located between the AC I/O 440 and the AC power source 444 to isolate the UPS 450 from the AC power source 444. The isolation switch (or another isolation switch) can be employed to isolate the AC I/O from the secondary load 448.

As discussed above with reference to FIG. 3, the DC source 422 can be any type of source of DC power including a DC generator (e.g., driven by a microturbine, a gas turbine, a wind turbine, a combustion motor, etc.), a fuel cell power source, a photovoltaic power source, and the like. In one embodiment, an output 431 of the DC source is connected to a third circuit 432 that regulates the power provided by the DC source 432 before it is connected to the DC bus 430. In versions of one or more embodiments employing the third circuit 432, the third circuit 432 is a converter, for example, a DC/DC converter that receives power from the DC source 422 at a first voltage level and produces a DC voltage at a second voltage level that can be different than the first voltage level. In other embodiments, the third circuit 432 is not employed in the UPS system 449. Where a modular design is employed, one or more of the first circuit 452, the second circuit 426, the third circuit 432, and the fourth circuit 454 can be a separate module.

The DC bus 430 connects a DC I/O 434 of the first circuit 452 to an input 436 of the second circuit 426 via the DC bus 430. The batteries 428 and, in one embodiment, an output of the converter 432 are also connected to the DC bus 430.

The components of the UPS system 449 can be combined such that, in one embodiment, the UPS system 449 includes a UPS 450 including the first circuit 452 and the second circuit 426. In a further embodiment, the UPS 450 includes the batteries 428. In one embodiment, the UPS 450 is a modular system such that the first circuit 452 is included in a first module and the second circuit 426 is included in a second module. In a version of this embodiment, the batteries 428 are included in a third module that is connected to the first module as shown in FIG. 4. In addition, the UPS 450 can include an AC I/O 440 connected to the first circuit 452, an output 442 connected to the second circuit 426, and a DC bus 430. According to one embodiment, the AC I/O 440 is included in the first circuit 452 and the output 442 is included in the second circuit 426. The UPS 450 may also be configured such that, in some embodiments, the DC source 422 is included in the UPS 450. In a version of this embodiment, the third circuit 432 is also included in the UPS 450. In another embodiment, the DC source is external to the UPS 450. In versions of this embodiment, the third circuit 432 may or may not be included in the UPS 450. The UPS 450 may also be configured such that, in some embodiments, the DC source 422 is included in the UPS 450. In a version of this embodiment, the third circuit 432 is also included in the UPS 450. In another embodiment, the DC source is external to the UPS 450. In versions of this embodiment, the third circuit 432 may or may not be included in the UPS 450.

In one embodiment, the DC bus 430 can be any circuitry that is employed to transmit DC from the first circuit 452 to the second circuit 426. That is, the DC bus 430 may be one or more conductors such as cables, DC links, bus bar, solder tracing, etc. provided that the DC bus 430 is rated for the current, voltage and power at which it will operate.

The circuitry included in the UPS 450 (e.g., the first circuit 452, the second circuit 426, the third circuit 432, the fourth circuit 454, etc.) can be any form of circuitry rated for the current, voltage and power at which it will operate. That is, the circuitry can include electronic circuitry that may include power electronic components. The circuitry can also include both analog and digital components including one or more microprocessors employed in controlling the operation of the UPS 450. In one or more further embodiments, the DC bus 430 is included, at least in part, in the first circuit 452, the second circuit 426 or the third circuit 432. In a version of these embodiments, portions of the DC bus 430 are included in each of the first circuit 452 and the second circuit 426. In another version, portions of the DC bus 430 are included in each of the first circuit 452, the second circuit 426 and the third circuit 432.

According to one embodiment, the UPS system 449 is included in an electrical system where an AC power source 444 is supplied to the AC I/O 440 of the UPS 450. The first power source can also be connected to one or more secondary loads 448 and the output 442 of the UPS can be connected to one or more primary loads 446.

Here too, the first circuit 452 is bi-directional where bi-directional functionality allows the UPS 450 to operate in at least two modes of operation. In a first mode of operation, the first circuit 452 receives power from the AC power source 444 and provides power at the DC I/O 434 of the first circuit 452. In a second mode of operation the first circuit receives power at the DC I/O 434 and provides power at the AC I/O 440 of the UPS. In various embodiments, the DC source 422 can supply power to the DC bus 430 in both the first mode of operation and the second mode of operation. In addition, in embodiments of the UPS system in FIG. 4, the AC power source 444 may or may not be available to supply power in the second mode of operation. That is, in some circumstances, the AC power source 444 may be de-energized or electrically isolated from the AC I/O 440.

In one embodiment, in the first mode of operation, the AC power source 444 provides power to the secondary load 448 and, via the UPS 450, also provides power to the primary load 446 connected to the output 442 of the UPS 450. In one embodiment of the second mode of operation, the DC source 422 provides power to the DC I/O 434 of the first circuit 452 and to an input 447 of the second circuit 426. As is described in greater detail herein, the power supplied by the DC source 422 to the first circuit 452 that is converted to AC by the first circuit 452 is supplied at the AC I/O 440 of the UPS. The power supplied by the DC source 422 to the second circuit 426 is converted to AC by the second circuit 426 and is supplied at the output 442 of the UPS 450. In one or more embodiments, the DC source 422 has a capacity that is sufficient to supply the combined power requirements of the primary load 446 and the secondary load 448. In these embodiments, the DC source 422 can be employed to supply power to both the primary load 446 and the secondary load 448 when the AC power source 444 is not available, i.e., the AC power source 444 is not supplying power for a period of time. Where the DC source 422 is an extended-runtime source, power can be supplied to the primary load 446 and the secondary load 448 on a continuous basis for an extended period.

In one embodiment, operation of the first circuit 452 is controlled such that the UPS 450 can operate in parallel with the AC power source 444. For example, while the AC power source 444 is energized and connected to the UPS system at the AC I/O 440, power generated by the DC source 422 can be supplied to the input of the UPS 450. In a version of this embodiment, with the DC source 422 operational and supplying power to the primary load 446, logic in the UPS determines whether the DC source 422 has capacity available to supply power to, for example, the secondary load 448. If so, the first circuit 452 is operated such that power supplied from the DC source is provided at the AC I/O 440 of the UPS after it is converted to AC by the first circuit 452. The power from the DC source 422 that is provided to the AC I/O 440 is then supplied, for example, to either or both of the secondary load 448 and the electrical system that connects the AC power source 444 to the UPS 450, e.g., a utility electrical system. That is, the DC power from the DC source that is provided to the AC I/O 440 need not be supplied to a secondary load but may instead simply be transmitted to a larger electrical system such as a utility power grid.

As originally described with reference to FIG. 3, in one or more embodiments, the DC source 422 may not have the capacity to supply all the power required by the primary load 446. In this circumstance, in the first mode of operation, power from the AC power source 444 can be used to supplement the power supplied from the DC source 422 to the primary load 446. For example, the first circuit 452 can convert the AC power supplied by the AC power source 444 to DC at the DC I/O 444 of the first circuit 452 while the DC source 422 is also supplying power to the DC bus 430. The converted AC power (i.e., the DC at the DC I/O 434) supplied by the AC power source 444 is transmitted via the DC bus 430 to an input 447 of the second circuit 426. Power supplied by the DC source 422 can also be simultaneously supplied to the input 447 of the second circuit 426 via the DC bus 430. The combined power supplied by the AC power source 444 and the DC source 422 to the input 447 is converted from DC to AC by the second circuit 426 at the output 442 of the UPS 450 where it is supplied to the primary load 446.

Because the primary load 446 is connected to the output 442 of the UPS 450 the primary load 446 is supplied with a highly reliable power source. As a result, the primary load 446 will not likely experience unplanned power shutdowns. For example, power from the AC power source 444 can be supplied to the output 442 of the UPS. Where the AC power source 444 is unavailable or of limited capacity, power can be supplied to the output 442 of the UPS from the DC source 422. In addition, power from the batteries 428 can be supplied to the output 442 of the UPS to supplement power supplied by AC power source 444 and/or the DC power source 422, or to provide the sole source of power to the primary load 446 on a temporary basis when neither the AC power source 444 nor the DC source 422 are available. In one embodiment, the AC power source 444 is the primary power source to the primary load 446 and the DC source 422 is used to supplement the AC power source as necessary to meet the power requirements of the primary load 442. In another embodiment, the DC source 422 is the primary power source for the primary load 446 and the AC power source 444 supplements the DC source as necessary to meet the power requirements of the primary load 442.

The embodiment depicted in FIG. 4 also differs from the embodiment depicted in FIG. 3 because the batteries 428 are connected to the fourth circuit 454, i.e., the batteries 428 are not connected to the DC bus 430 in parallel with the DC source 422. Thus, in one embodiment, the fourth circuit includes an input 456. As a result, the third circuit includes the input 456 in embodiments where the fourth circuit is included in the third circuit.

Each of the embodiments shown in FIGS. 3 and 4 can include a power factor correction circuit. That is, a circuit that controls the power drawn by the UPS from the AC power source 334, 444 such that the AC current that is drawn is controlled to be substantially in phase with the AC voltage. In some embodiments, the power factor correction circuit may also control the phase-relationship between the current and the voltage supplied to the AC I/O 340, 440. In embodiments of the UPS systems of FIGS. 3 and 4, the power factor correction circuit is included in the first circuit 324, 452, respectively. In an embodiment of FIG. 4, the power factor correction circuit is included in the fourth circuit 454.

Figure 5:
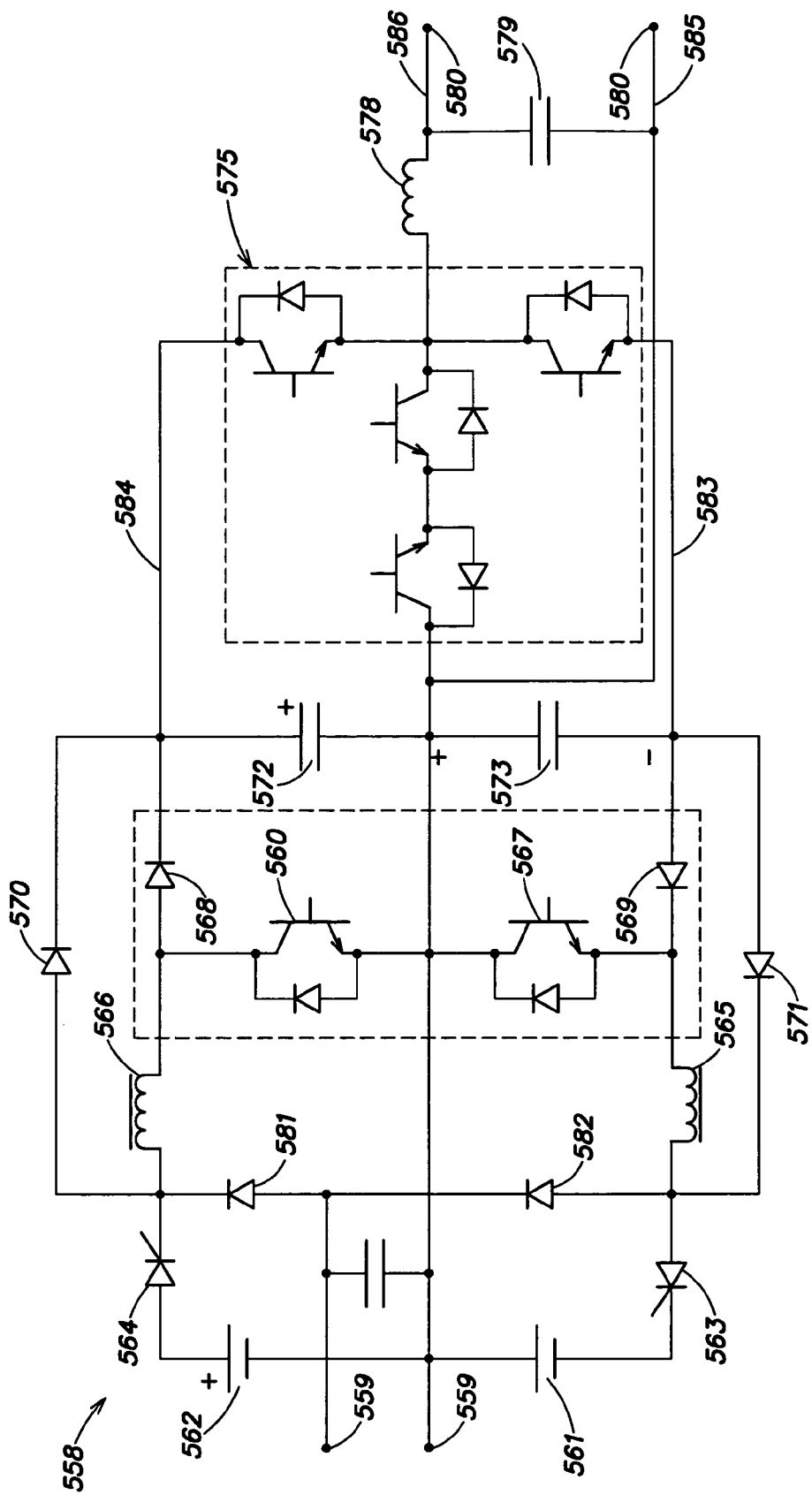
FIG. 5 is a schematic of a prior art circuit employed in an uninterruptible power supply.

Referring now to FIG. 5, a circuit 558 employed in a prior art UPS of the type depicted in FIG. 2 is shown. The circuit 558 includes an AC input 559, batteries 561, 562, switches 563, 564 (e.g., thyristors), inductors 565, 566, switches 560, 567 (e.g., insulated gate bipolar transistors), diodes 568, 569 employed in a boost circuit, diodes 570, 571 employed in startup, input diodes 581, 582, capacitors 572, 573, a positive DC bus 584, a negative DC bus 583, an inverter 575, an inductor 578, an output capacitor 579 and an output 580.

In general, during its operation the circuit 558 receives a single phase AC input at input 559 converts it to DC with the diodes 581 and 582, controls the power drawn from the AC input and supplied to negative and positive DC busses 583, 584 by controlling the operation of switches 560, 567, and converts the DC from the DC bus to AC at the output 580 with the inverter 575. This approach is described in greater detail, for example, in International Application No. PCT/DK02/00041, filed on Jan. 22, 2002, by American Power Conversion Denmark APS, the disclosure of which is incorporated herein by reference.

In one embodiment, the circuit 558 includes two boost circuits that can be controlled to draw current from the AC input 559 that is in phase with the AC voltage at the input, i.e., the boost circuits can be used for power factor control of the power drawn from the AC power source. In a version of this embodiment, the switches 560 and 567 are each employed in a boost circuit as is well known in the art. The switch 560 is employed in the boost circuit that supplies DC voltage to the positive DC bus 584 and switch 567 is employed in the boost circuit that supplies DC voltage to the negative DC bus 583. More specifically, the boost circuit that supplies power to the positive DC bus 584 includes the inductor 566, the switch 560, the diode 568 and the capacitor 572. In operation, the switch 560 is periodically turned on during a first period in which the inductor 566 is connected across the input 559 through diode 581, and periodically turned off during a second period during which the energy that is stored in the inductor is supplied to the capacitor 584 and the positive DC bus 584 via diode 568. The capacitor 572 DC stores energy during the second period which can be discharged during the first period. The charge that is built up on the capacitor 572 is positive with respect to a neutral 585. The boost circuit associated with the negative DC bus 583 operates in a similar fashion using a circuit including the inductor 565, the switch 567, the diode 569 and the capacitor 573, however, the charge that is built up on the capacitor 572 is negative with respect to the neutral 585.

The DC from the DC busses 583, 584 is converted to an AC output at the output 580 by the inverter 575 by periodically connecting the positive DC bus 584 to the AC line 586 during the positive half cycle of the AC output and connecting the negative DC bus 583 to the AC line 586 during the negative half cycle of the AC output. As is seen in FIG. 5, a continuous connection is maintained in the AC neutral 585 from the input 559 to the output 580. In one embodiment, the inverter 575 is a circuit that includes electronic switches, for example, insulated gate bipolar transistors. In a version of this embodiment, the switches included in the inverter 575 receive control signals from a controller (e.g., a microprocessor) in the UPS that also controls the switching of the switches 560, 567.

In the embodiment shown in FIG. 5, the inductor 578 and the capacitor 579 provide a filter that reduces noise that may be included in the power signal supplied by the inverter 575 at the output 580.

The batteries 561, 562 are used to supply DC power when the AC is unavailable or when the AC power is insufficient to meet the power requirements of load connected to the output 580. DC power from the batteries 561, 562 can be supplied, for example, using the switch 564 to connect a positive terminal of battery 562 to the inductor 566 and using the switch 563 to connect a negative terminal of battery 561 to the inductor 565. In one embodiment, operation of the switches 563, 564 is controlled by a controller that controls the switching of the switches in the inverter 575 and the switches 560, 567.

According to one embodiment, the diodes 570, 571 are used to provide a clamp against transient overvoltages (e.g., overvoltages caused by lighting). For example, in one embodiment, the diodes 570, 571 provide a circuit connecting the input diodes 581, 582 to the capacitors 572, 573, respectively. That circuit can operate to protect the diodes 581, 582 and the switches 563, 564 from transient overvoltages (for example, overvoltages transmitted from the AC power source to the AC input 559) by directly connecting them to the capacitors 572, 573 which absorb the energy of the transient.

Figure 6:
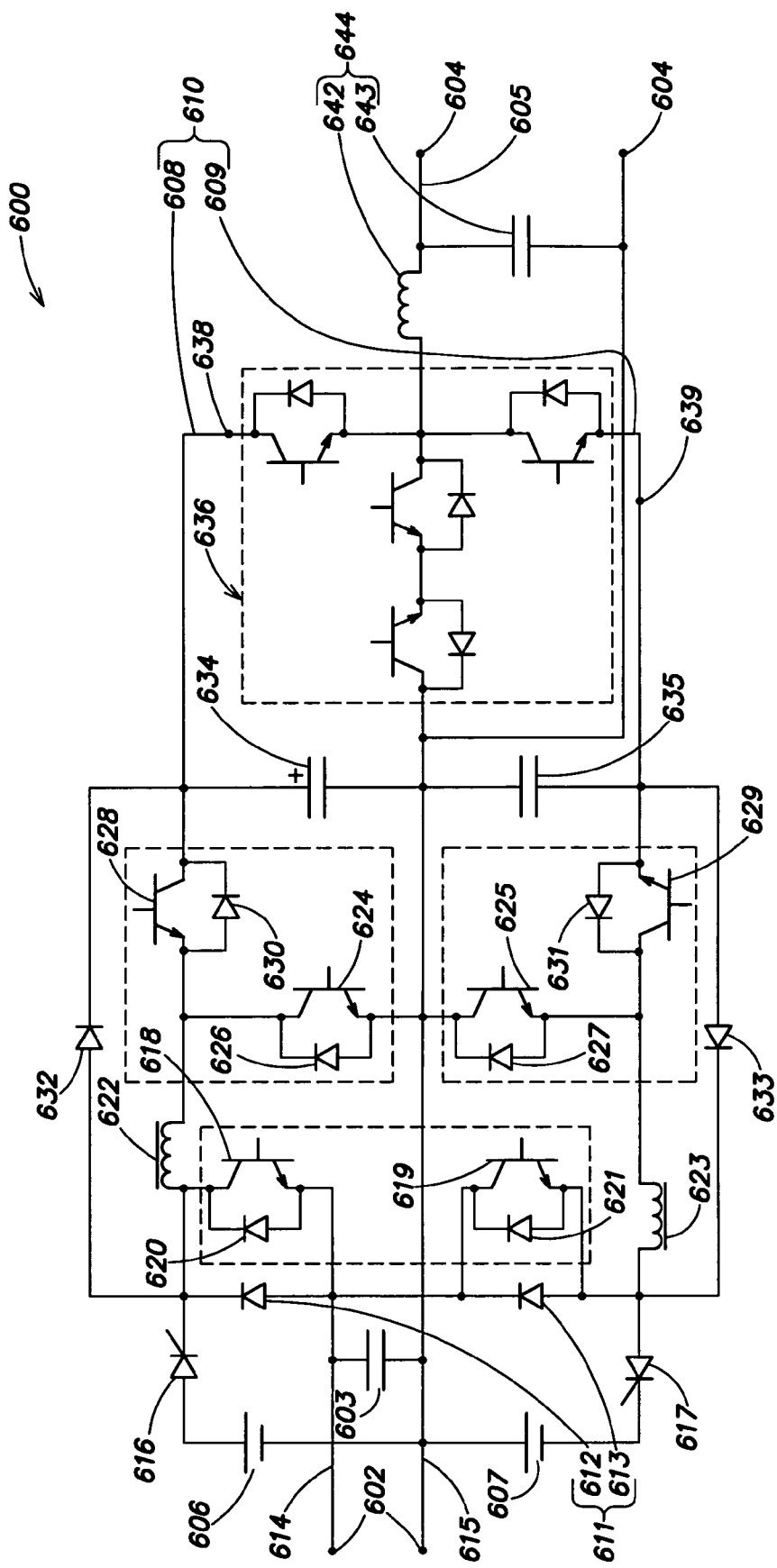
FIG. 6 is a schematic of a circuit employed in one embodiment of the invention.

Referring now to FIG. 6, an embodiment of a UPS 600 that includes circuitry capable of multiple modes of operation is shown. In one embodiment, the UPS 600 is employed in the UPS system 449 as shown in FIG. 4.

In one embodiment, the UPS 600 includes an AC I/O 602, an output 604, batteries 606, 607, and a DC bus 610. In a version of this embodiment, the DC bus 610 includes a positive bus 608 and a negative bus 609. Further, in some embodiments, the DC generator is a dual voltage generator (for example, generating +200V and −200V) while in other embodiments the DC generator provides a single voltage for connection across the positive and negative busses 608, 609 (for example, +400V). In one embodiment, the UPS 600 includes a DC input connected to points 638, 639 of the UPS 600, i.e., to the positive bus 608 and the negative bus 609. An AC source of power (e.g., a utility) can be connected to the AC I/O 602. A DC source can be connected to the UPS 600 at the points 638, 639. The DC source may be any type of DC source, for example, fuel cells, photovoltaic power sources, and DC micro turbines. In a version of this embodiment, the DC source is employed to continuously power electrical load connected to the AC I/O 602 and load connected to the output 604. The DC source can be external to the UPS 600 and the UPS 600 and the DC source can be combined in a UPS system. Alternatively, the UPS 600 may include the DC source.

The UPS 600 includes circuitry that may include a rectifier 611 that in one embodiment includes a first diode 612 and a second diode 613 where the first diode 612 conducts when the AC input is positive and the second diode 613 conducts when the AC input is negative. The AC input 602 includes an AC line 614 and a neutral 615 where, in one embodiment, the AC line 614 is connected to an anode of the first diode 612 and a cathode of the second diode 613. In one embodiment, the neutral 615 runs continuously (i.e., it is not switched or otherwise interrupted) from the AC I/O 602 to the output 604. In addition to the neutral 615, the output 604 includes an AC output line 605. The UPS 600 may also include a capacitor 603 connected across the AC I/O 602, i.e., between the AC line 614 and the neutral 615. In the embodiment shown in FIG. 6, the AC input 602 is a single phase input. In a version of this embodiment, a three phase UPS includes three circuits such as is illustrated in FIG. 6, where the three circuits typically share a DC bus (e.g., the DC bus 610) that is common to each.

In one embodiment, the UPS 600 includes a circuit for converting power from the AC I/O 602 to DC at the DC bus 610. In a version of this embodiment, a separate boost circuit is provided for each of the positive bus 608 and the negative bus 609, respectively. The UPS can also include an inverter 636 to convert DC supplied to the DC bus 610 to AC at the output 604 of the UPS.

In one embodiment, the UPS 600 includes a circuit for converting DC supplied to the DC bus 610 to AC at the AC I/O 602. In a version of this embodiment, a separate buck circuit is provided to convert power supplied from the positive bus 608 and the negative bus 609, respectively.

Batteries 606, 607 are connected to switches 616, 617 (e.g., thyristors). A positive terminal of the battery 606 is connected to the switch 616 and the negative terminal of the battery 606 is connected to the neutral 615. Conversely, a positive terminal of the battery 607 is connected to neutral 615 and a negative terminal of the battery 607 is connected to the switch 617.

According to one embodiment, the UPS 600 also includes circuits connected in parallel with the two halves of the rectifier 611. A switch 618 is connected in parallel with the first diode 612 and a switch 619 is connected in parallel with the second diode 613. In one embodiment, the switches 618, 619 are transistors. In a version of this embodiment, the switches are insulated gate bipolar transistors. In addition to the switches 618, 619, in one version, a diode 620, 621 is also connected across the switches 618, 619, respectively, where diode 620 is included as part of switch 618 and diode 621 is included as part of switch 619. In one embodiment, one of diodes 612, 620 and one of diodes 613, 621 is not included in the UPS 600. As is described in greater detail below, the circuits connected in parallel with the rectifier 611 are employed to bypass the rectifier 611 when the UPS 600 is operating in one or more modes of operation.

In one embodiment, the UPS also includes inductors 622, 623. The inductor 622 is connected to the cathode of the first diode 612 and the switches 624, 628. The inductor 623 is connected to the anode of the second diode 614 and switches 625, 629. The switch 630 is connected to the positive DC bus 608, and the switch 629 is connected to the negative DC bus 609. The switches 624, 625 are each connected to the neutral 615. In one embodiment, the switches 624, 625, 628, and 629 are transistors. In this embodiment, the collector of the switch 624 is connected to the inductor 622 and to the emitter of the switch 628 while the emitter of the switch 624 is connected to the neutral 615. The collector of the switch 625 is connected to the neutral 615 while the emitter of the switch 625 is connected to the inductor 623 and to the collector of the switch 629. The collector of the switch 628 is connected to positive bus 608 and the emitter of the switch 629 is connected to the negative bus 609. The gate of each of the switches 624, 625, 628, 629 can be connected to a control circuit (e.g., a circuit including a microprocessor) that controls when each of the switches 624, 625, 628, 629 are switched on and off. In a version of the preceding embodiment, the switches are insulated gate bipolar transistors.

The UPS also includes capacitors 634, 635 where the capacitor 634 is connected to the positive DC bus 608 and the neutral 615, and the capacitor 635 is connected to the negative DC bus 609 and neutral 615. The capacitors 634, 635 may be employed, for example, in a boost circuit when power is being supplied to the DC bus 610 from the AC I/O or the batteries 606, 607.

The UPS shown in FIG. 6 includes an inverter 636 that converts DC from the DC bus 610 to AC at the output 604 by periodically connecting the positive DC bus 608 to the AC line 605 during the positive half cycle of the AC output and connecting the negative DC bus 609 to the AC line 605 during the negative half cycle of the AC output. As shown in FIG. 6, a continuous connection is maintained between the AC neutral 615 at the input 602 and the AC neutral 615 at the output 604.

In one embodiment, the output of the UPS includes a filter 644 that includes an inductor 642 and a capacitor 643. The filter 644 reduces noise that may be included in the power signal supplied by the inverter 636.

The batteries 606, 607 can be used to supply DC power when the AC is unavailable or when the AC power source is insufficient to meet the power requirements of load connected to the output 604. DC power from the batteries 606, 607 can be supplied, for example, using the switch 616 to connect a positive terminal of battery 606 to the inductor 622 and using the switch 617 to connect a negative terminal of battery 607 to the inductor 623. In one embodiment, operation of the switches 616, 617 is controlled by a controller in the UPS that controls the switching of the switches in the inverter 636 and the switches 624, 625, 628, 629.

As described previously with reference to the diodes 570, 571, the diodes 632, 633 are used to provide a clamp against transient overvoltages. For example, in one embodiment, the diodes 632, 633 provide a circuit connecting the diodes 612, 613 and the switches 616, 617 to the capacitors 634, 635, respectively.

The UPS 600 differs from the circuit shown in FIG. 5 because, in one embodiment, the UPS 600 includes a combination of one or more circuits to convert AC received at the AC I/O to DC (e.g., a boost circuit) at the DC bus 610 and one or more circuits to convert DC supplied to the DC bus 610 (e.g., from a DC source at points 638, 639) to AC at the AC I/O 602 (e.g., a buck circuit). Accordingly, the UPS 600 can be operated in at least two modes of operation; a first mode in which AC power supplied to the AC I/O 602 is converted to DC at the DC bus 610, and a second mode where power supplied by the DC source is converted to AC at the AC I/O 602. In a version of this embodiment, one or more circuit elements that are included in the boost circuit are also included in the buck circuit, e.g., the same inductor may be used in each circuit. In either mode, power supplied at points 638, 639 can be converted to AC by inverter 636 at the output 604 to supply power to load connected to the output 604. In the second mode, DC power supplied at points 638, 639 can be converted to AC at the AC I/O 602 where it can be supplied to load connected to the AC I/O 602. In one embodiment, the converted DC power is directly supplied to load connected to the AC I/O 602, for example, secondary load. In another embodiment, the converted DC power is supplied to a power grid connected to the AC I/O 602.

In one embodiment, the switches 624, 625 are each employed in a boost circuit. In a version of this embodiment, the switch 624 is employed in a circuit that supplies DC voltage to the positive DC bus 608 and the switch 625 is employed in a circuit that supplies DC voltage to the negative DC bus 609. More specifically, the boost circuit that supplies power to the positive DC bus 608 includes the inductor 622, the switch 624, the diode 630 and the capacitor 634. In operation, the switch 624 is periodically turned on during a first period in which the inductor 622 is connected to the neutral 615 through the switch 624, and periodically turned off during a second period during which the energy that is stored in the inductor 622 in the first period can be supplied to the positive DC bus 608 via diode 630. The capacitor 634 stores energy during the second period which can be discharged during the first period. The charge that is built up on the capacitor 634 is positive with respect to the neutral 615. The boost circuit associated with the negative DC bus 609 operates in a similar fashion using a circuit including the inductor 623, the switch 627, the diode 631 and the capacitor 635, however, the charge that is built up on the capacitor 635 is negative with respect to the neutral 615. In this mode of operation, the UPS 600 may also include control circuitry to control the power factor of the power that is drawn from the AC power source connected to the AC I/O 602.

In addition to circuitry that is employed to convert AC power supplied to the AC I/O 602 to DC, in one embodiment, the UPS 600 also includes circuitry that converts DC supplied at the DC bus 610 to AC at the AC I/O 602. When AC power is being drawn from an AC power source connected to the AC I/O 602, the switches 618, 619 are turned off and the AC power is rectified by the rectifier 611. When power is being supplied from the DC bus 610 to the AC I/O 602, however, the switches 618, 619 are turned on to provide a current path that bypasses the rectifier 611. In one embodiment, the switch 618 bypasses the diode 612 and the switch 619 bypasses the diode 613. Where the UPS 600 includes diodes 620, 621 the switch 618 also bypasses the diode 620 and the switch 619 also bypasses the diode 621.

Portions of the circuitry used to convert AC to DC may also be employed to convert DC to AC. For example, the UPS 600 can include one or more buck circuits that include the switches 628, 629, the diodes 626, 627, the inductors 622, 623, and the capacitor 603. In one embodiment, the UPS 600 circuit that supplies power from the positive bus 608 to the AC I/O 602 operates by periodically turning on the switch 628 to allow inductor 622 to store power supplied to it from the DC source connected to the DC bus 610 at the points 638, 639. During a first period, with the switch 628 on, a current path is created from the positive bus 608 through the inductor 622 to the AC I/O via the switch 618. Energy is stored in the inductor 622 during this period. When the switch 628 is turned off a current path is created from the inductor 622 to the capacitor 603 via the diode 626. The switch 628 is operated to provide a source of AC power during the positive half cycle of the AC waveform. A circuit including the switch 629, the diode 627, the inductor 623, and the capacitor 603 operates in a similar fashion to provide a source of AC power during the negative half of the AC waveform. More specifically, during a first period, with the switch 629 on, a current path is created from the negative bus 609 through the inductor 623 to the AC I/O via the switch 619. Energy is stored in the inductor 623 during this period. When the switch 629 is turned off a current path is created from the inductor 623 to the capacitor 603 via the diode 627.

In general, when an AC power source is supplying power to the AC I/O 602 the UPS circuitry operates to receive the AC power at AC I/O 602, to convert the AC power to DC with the diodes 612 and 613, to control the power drawn from the AC I/O 602 and supplied to negative and positive DC busses 608, 609 by controlling the operation of the switches 628, 629, and to convert the DC from the DC bus 610 to AC at the output 604 by controlling the operation of the switches 624, 625, 628, 629.

To study circuit operation, a plot that includes a vertical axis representing current and a horizontal axis representing voltage is often referred to when describing the various combinations of voltage/current polarities. The axes are oriented transverse to one another to form four quadrants: quadrant 1—positive voltage/positive current; quadrant 2—negative voltage/positive current; quadrant 3—negative voltage/negative current; and quadrant 4—positive voltage/negative current. Typically for reference, positive current is considered to be a current that flows out of the AC terminals of an inverter, for example, to a load.

Prior art circuits (for example, those included in UPS 500) did not include circuit elements corresponding to switches 618, 619, 628 and 629. Accordingly, the prior art UPSs employed circuitry that operated in two of the four quadrants, i.e., with two of the four possible combinations of voltage/current polarities. That is, the circuitry connected to the AC input 559 in these prior art UPSs operated in quadrant 2 and quadrant 4, i.e., with the voltage and current having opposite polarity to one another. As a result, these prior art UPSs included circuitry connected to the AC input 559 that operated solely as a rectifier to convert AC power to DC power supplied to a DC bus.

In contrast to the prior art, according to one embodiment, the UPS 600 includes circuitry connected to the AC I/O 602 that provides 4-quadrant operation. That is, the circuitry connected to the AC I/O 602 can operate with any combination of voltage/current polarity, i.e., operate in any of quadrant 1, quadrant 2, quadrant 3 and quadrant 4.

As a result, as described above, the UPS 600 can convert an AC input supplied to the AC I/O 602 to DC supplied to the DC bus 610 and convert DC power supplied to the DC bus 610 to AC power supplied to the AC I/O 602. According to one embodiment, first circuitry of the UPS 600 (e.g., input circuitry) is configured to operate as either a rectifier or an inverter. In one embodiment, power is supplied from the AC input 602 to the DC bus 610 when the first circuitry operates as a rectifier, and power is supplied from the DC bus 610 to the AC input 602 when the first circuitry operates as an inverter.

According to one embodiment, the UPS 600 operates in quadrant 1 by operating the switch 628 with a PWM signal, turning the switch 618 on, and turning the switch 624 off to provide operation as a buck converter. Optionally, the switch 624 may be operated with a PWM signal that is opposite to that supplied to the switch 628 provided that a relatively small period of time is included between the moment when a first one of the two switches is turned off and the moment when the second of the two switches is turned on. In operation, embodiments of the UPS operating in quadrant 1 store energy from the DC bus in the inductor 622 when the switch 628 is on. When the switch 628 is off, the stored energy can be supplied to the AC input 602 with a circuit that includes the inductor 622 and the diode 626.

In a further embodiment, the UPS 600 operates in quadrant 4, by operating the switch 624 with a PWM signal and turning off the switches 618 and 628 to provide operation as a boost converter. In operation, embodiments of the UPS operating in quadrant 4 store energy in the inductor 622 when the switch 624 is on. When the switch 624 is off, the stored energy can be supplied to the positive DC bus 608 with a circuit that includes the inductor 622 and the diode 630.

According to a still further embodiment, the UPS 600 operates in quadrant 2 by operating the switch 625 with a PWM signal and turning off the switches 619 and 629 to provide operation as a boost converter. In operation, embodiments of the UPS operating in quadrant 2 store energy in the inductor 623 when the switch 625 is on. When the switch 625 is off, the stored energy can be supplied to the negative DC bus 609 with a circuit that includes the inductor 623 and the diode 631.

According to yet a further embodiment, the UPS 600 operates in quadrant 3 by operating the switch 629 with a PWM signal, turning the switch 619 on, and turning the switch 625 off to provide operation as a buck converter. Optionally, the switch 625 may be operated with a PWM signal that is opposite to that supplied to the switch 629 provided that a relatively small period of time is included between the moment when a first one of the two switches is turned off and the moment when the second of the two switches is turned on. In operation, embodiments of the UPS operating in quadrant 3 store energy from the DC bus in the inductor 623 when the switch 629 is on. When the switch 629 is off, the stored energy can be supplied to the AC input 602 with a circuit that includes the inductor 623 and the diode 627.

Connection of the DC source to the DC bus 610 at points 638, 639 can be completed by any well known means included compression or bolted connections, cabling, bus bar or any combination of these and other known approaches. In one embodiment, over current protection is present in the circuit that connects the DC source to the DC bus 610.

According to one embodiment, a converter (e.g., a DC/DC converter) or other circuitry can be connected at the output of the DC source. In a version of this embodiment, an output of the converter is connected to the points 638, 639.

Inverters which can be employed with the UPS 600 include any of a variety of inverter topologies. These include inverters that employ a two-level topology, a three-level topology as illustrated in FIG. 6, alternative three-level topologies, and other alternative multi-level topologies.

According to another embodiment, the approaches described herein are employed with other UPS topologies including delta conversion topologies. For example, in a version of this embodiment, a DC source can be connected to a DC bus in parallel with the batteries employed with a UPS using a delta conversion topology such as a SILICON™ UPS manufactured by American Power Conversion Corporation or as described in U.S. Pat. No. 6,069,412, issued May 30, 2000, to Raddi et al., the disclosure of which is incorporated herein by reference.

As used herein, the term "load" is used to describe both a single electrical load and two or more electrical loads. As such, a single circuit or multiple circuits can connect electrical load to a UPS.

Having thus described several aspects of at least one embodiment of this invention, it is to be appreciated that various alterations, modifications, and improvements will readily occur to those skilled in the art. Such alterations, modifications, and improvements are intended to be part of this disclosure, and are intended to be within the spirit and scope of the invention. Accordingly, the foregoing description and drawings are by way of example only.

What is claimed is:

1. An uninterruptible power supply comprising:
an AC I/O;
an output in electrical communication with the AC I/O;
electronic circuitry coupled to the AC I/O and the output and comprising a first circuit and a second circuit, wherein the first circuit includes a DC I/O and an input coupled to the DC I/O via the first circuit, the input adapted to be connected to a battery;
a DC bus including a positive bus and a negative bus each coupled to the DC I/O, wherein the DC bus couples the first circuit to the second circuit; and
a DC power source, different than the battery, coupled to the DC bus,
wherein the first circuit is adapted to, in a first mode of operation, receive AC power from the AC I/O and convert the AC power to DC power, and in a second mode of operation, receive DC power from the DC power source at the DC I/O, convert the DC power to AC power and provide AC power to the AC I/O, and
wherein the second circuit is further adapted to, in the first mode of operation, convert the DC power to AC power and provide the AC power at the output.

2. The uninterruptible power supply of claim 1, wherein the electronic circuitry is further adapted to receive power from an external AC power source in the first mode of operation.

3. The uninterruptible power supply of claim 1, wherein the DC power source comprises an extended-runtime DC source.

4. The uninterruptible power supply of claim 1, wherein the second circuit is adapted to receive DC power from the DC power source and provide AC power to the output in the second mode of operation.

5. The uninterruptible power supply of claim 1, wherein, in the second mode of operation, the electronic circuitry is configured to supply power to a first load from the AC I/O and supply power to a second load from the output.

6. The uninterruptible power supply of claim 5, wherein, in the first mode of operation, an external AC power source is configured to supply power to both the first load and the AC I/O.

7. The uninterruptible power supply of claim 1, wherein the electronic circuitry is further adapted to draw a current from the AC power source that is substantially in phase with a voltage of the AC power source.

8. The uninterruptible power supply of claim 1, wherein the first circuit comprises a circuit that is configured to operate as a boost converter in the first mode of operation, and wherein at least a portion of the circuit that is configured to operate as the boost converter is also configured to be included in a buck converter circuit in the second mode of operation.

9. The uninterruptible power supply of claim 8, wherein the first circuit comprises a rectifier coupled to the AC I/O, and wherein the first circuit is adapted to bypass the rectifier during the second mode of operation.

10. The uninterruptible power supply of claim 8, wherein the at least a portion of the circuit comprises an inductor, wherein the inductor is employed in the first circuit to store energy from at least one of the battery and the AC power source in the first mode of operation, and wherein the inductor is employed in the first circuit to store energy from the DC power source in the second mode of operation.

11. The uninterruptible power supply of claim 8, wherein the first circuit comprises a first boost circuit coupled to the positive bus and a second boost circuit coupled to the negative bus, and wherein the first circuit further comprises a first buck circuit coupled to the positive bus and a second buck circuit coupled to the negative bus.

12. The uninterruptible power supply of claim 10, wherein the first circuit comprises a switch coupled in series between the DC bus and the inductor, and wherein the switch is operated to couple the inductor to the DC power source in the second mode of operation.

13. The uninterruptible power supply of claim 10, wherein the first circuit includes power factor correction circuitry.

14. The uninterruptible power supply of claim 10, wherein the first circuit comprises a rectifier coupled to the AC I/O and the inductor, and a switch connected in parallel to the rectifier, wherein the switch is configured to bypass the rectifier in the second mode of operation.

15. A method of supplying power to two or more electrical loads using an AC power source and an uninterruptible power supply that includes an AC I/O, an output, a first module in electrical communication with the AC I/O and including a DC I/O and an input coupled to the DC I/O via the first module, a second module in electrical communication with the output of the uninterruptible power supply, and a DC bus including a positive bus and a negative bus each coupled to the DC I/O, the method comprising acts of:
  supplying, in a first mode of operation, power from the AC power source to the AC I/O of the uninterruptible power supply;
  supplying power from the AC power source to a first load in the first mode of operation;
  supplying power to a second load from the output of the uninterruptible power supply in the first mode of operation;
  supplying, in a second mode of operation, power to the first load from the AC I/O of the uninterruptible power supply;
  supplying power from at least one of a battery power source and the AC power source to the first module in a first mode of operation, wherein the battery power source is connected to the input of the first module;
  supplying, in the first mode of operation, power from the battery to the DC I/O via the first module and from the DC I/O to the second module via the DC bus; and
  supplying power from a DC power source, different than the battery power source, to both the first load and the second load in the second mode of operation, wherein the DC power source is connected to the DC bus.

16. The method of claim 15, further including circuitry connected to the AC I/O that is configured to provide for 4-quadrant operation of the UPS.

17. The method of claim 15, further comprising an act of supplying power to the second load from the output of the uninterruptible power supply in the second mode of operation.

18. The method of claim 17, wherein the DC power source is an extended-runtime DC source.

19. The method of claim 18, wherein the DC power source is at least one of a DC generator, a fuel cell, and a photovoltaic power source.

20. The method of claim 15, further comprising detecting loss of power from the AC power source and providing power from a DC generator to the first load and the second load.

21. The method of claim 20, wherein the method further comprises an act of providing power from the DC generator to the DC bus.

22. The method of claim 17 further comprising an act of determining whether the DC power source has a capacity to supply power to the first load and the second load.

23. The method of claim 22 further comprising an act of entering the second mode of operation when it is determined that the DC power source has the capacity to supply power to the first load and the second load.

24. A UPS system for supplying power to two or more electrical loads, the system comprising:
  an AC I/O adapted to connect to a first power source and a first load;
  a first circuit including a DC I/O adapted to connect to a second power source and an input coupled to the DC I/O via the first circuit, the input adapted to connect to a battery;
  an output adapted to connect to a second load;
  a second circuit adapted to convert DC power from a DC power source, different than the battery, to AC power and provide AC power at the output;
  a DC bus including a positive bus and a negative bus each coupled to the DC I/O, wherein the DC bus couples the first circuit to the second circuit; and
  means for receiving power from the first power source via the AC I/O during a first mode of operation, and supplying power from the second power source to the first load via the AC I/O during a second mode of operation,
  wherein the system is adapted to supply power from the output to the second load during both the first mode of operation and the second mode of operation.

25. The UPS system of claim 24, further comprising a circuit that is configured to operate as a boost converter in the first mode of operation, and wherein at least a portion of the circuit that is configured to operate as the boost converter is also configured to operate as a buck converter in the second mode of operation.

26. The UPS system of claim 25, wherein the at least a portion of the circuit comprises an inductor, wherein the inductor is employed to store energy from at least one of the battery and the first power source in the first mode of operation, and wherein the inductor is employed to store energy from the second power source in the second mode of operation.

27. The UPS system of claim 26, further comprising a switch coupled in series between the DC bus and the inductor, and wherein the switch is operated to couple the inductor to the second power source in the second mode of operation.

28. The UPS system of claim 26, further comprising a rectifier coupled to the AC I/O and the inductor, and a switch connected in parallel to the rectifier, wherein the switch is configured to bypass the rectifier in the second mode of operation.

29. The UPS system of claim 24, wherein the AC I/O is adapted for connection to an AC power source, and wherein the DC I/O is adapted for connection to the DC power source.

30. The UPS system of claim 29, wherein the DC I/O is adapted for connection to an extended-runtime DC power source.

31. The UPS system of claim 29, wherein the DC I/O is adapted for connection to a DC generator.

32. The UPS system of claim 24, wherein the means for receiving power includes means for drawing a current from the first power source that is substantially in phase with a voltage of the first power source.

33. The UPS system of claim 32 wherein during the first mode of operation the means for receiving power operates as a boost converter, and wherein during the second mode of operation the means for receiving power operates as a buck converter.

34. The UPS system of claim 33, wherein the means for receiving power includes a rectifier wherein the rectifier is bypassed during the second operation.

35. The UPS system of claim 24, further comprising:
   means for converting DC power to AC power which is supplied to the output,
   wherein the DC power which is converted includes DC power supplied from at least one of the battery, the second power source, and the means for receiving power.

* * * * *